(12) United States Patent
Cai et al.

(10) Patent No.: US 7,944,846 B1
(45) Date of Patent: May 17, 2011

(54) DVMRP BORDER ROUTER FOR REVERSE PATH FORWARDING VALIDATION WITH EXTERNAL SOURCES

(75) Inventors: Xiangrong Cai, Newton, MA (US); Haixiang He, Woburn, MA (US)

(73) Assignee: Avaya Inc., Basking Ridge, NJ (US)

( * ) Notice: Subject to any disclaimer, the term of this patent is extended or adjusted under 35 U.S.C. 154(b) by 720 days.

(21) Appl. No.: 11/207,036

(22) Filed: Aug. 18, 2005

(51) Int. Cl.
*H04L 12/26* (2006.01)
*H04L 12/28* (2006.01)
*H04J 3/26* (2006.01)

(52) U.S. Cl. .................. 370/252; 370/390; 370/432

(58) Field of Classification Search .................. 370/252, 370/351, 389, 390, 432, 392
See application file for complete search history.

(56) References Cited

U.S. PATENT DOCUMENTS

| | | | | |
|---|---|---|---|---|
| 6,526,054 | B1 * | 2/2003 | Li et al. | 370/390 |
| 2003/0026268 | A1 * | 2/2003 | Navas | 370/400 |
| 2003/0041171 | A1 * | 2/2003 | Kobayashi | 709/242 |
| 2003/0165140 | A1 * | 9/2003 | Tang et al. | 370/393 |
| 2005/0083933 | A1 * | 4/2005 | Fine et al. | 370/390 |
| 2006/0221962 | A1 * | 10/2006 | Previdi et al. | 370/390 |
| 2006/0268871 | A1 * | 11/2006 | Van Zijst | 370/390 |

* cited by examiner

*Primary Examiner* — Derrick W Ferris
*Assistant Examiner* — Angel Brockman
(74) *Attorney, Agent, or Firm* — Chapin IP Law, LLC; David W. Rouille, Esq.

(57) ABSTRACT

Described is a method for statically or dynamically enabling a DVMRP router in a DVMRP domain to perform a reverse path forwarding check for an external source. A route report is generated for each known external source and injected into the DVMRP domain. Each route report includes routing information for a respective one of the known external sources. In one embodiment, the route report is generated for each network listed in a unicast routing table maintained on a DVMRP multicast border router and each route report includes unicast routing information for each of the networks and an indicator designating that the routing information is derived from unicast routing information. In another embodiment, if it is determined that routing information for an external source of multicast traffic received at a DVMRP border router is not available, the route report is generated at that time and includes a predetermined metric value.

6 Claims, 4 Drawing Sheets

US 7,944,846 B1

DVMRP BORDER ROUTER FOR REVERSE PATH FORWARDING VALIDATION WITH EXTERNAL SOURCES

FIELD OF THE INVENTION

The invention relates generally to multicast routing protocols. More particularly, the invention relates to a multicast border router capable of performing a reverse path forwarding check for multicast sources that are external to a DVMRP domain.

BACKGROUND OF THE INVENTION

Distance Vector Multicast Routing Protocol (DVMRP) is a widely deployed multicast routing protocol. When used with other multicast routing protocols such as Protocol Independent Multicast-Sparse Mode (PIM-SM), however, reverse path forwarding (RPF) checking can fail. RPF is a validation check to determine whether a multicast packet came from the expected path, i.e., the reverse path. A RPF check can fail because the source can be an external source, i.e., a source located outside the DVMRP domain. For example, the external source can be in a PIM multicast routing domain.

The multicast routing information table maintained in a DVMRP router is generally limited to DVMRP-generated routing information. Typically there is no mechanism for the router to get the reverse path information of a source that is outside the DVMRP domain. Consequently, multicast traffic provided to a DVMRP multicast border router (MBR) from an external source and subsequently delivered to a DVMRP router that is not a MBR generally does not include the RPF information for the external source. As a result, the multicast traffic may be dropped.

What is needed is a method to enable a non-MBR DVMRP in a DVMRP domain to perform the RPF validation check. The present invention satisfies this need and provides additional advantages.

SUMMARY OF THE INVENTION

In one aspect, the invention features a method for enabling a Distance Vector Multicast Routing Protocol (DVMRP) router in a DVMRP domain to perform a reverse path forwarding check for external sources. A static route report is generated for each of a plurality of known external sources and injected into the DVMRP domain. Each static route report includes routing information for a respective one of the known external sources. The static route reports can be propagated in the DVMRP domain so that all DVMRP routers in the DVMRP domain receive the routing information for the known external sources.

In another aspect, the invention features a method for dynamically enabling a DVMRP router in a DVMRP domain to perform a reverse path forwarding check for an external source. A route report is generated for each network listed in a unicast routing table maintained on a DVMRP multicast border router and injected into the DVMRP domain. Each route report includes unicast routing information for each of the networks and an indicator designating that the routing information was derived from unicast routing information. The route reports can be propagated in the DVMRP domain so that all DVMRP routers in the DVMRP domain receive the routing information for each of the networks listed in the unicast routing table.

In yet another aspect, the invention features a method for dynamically enabling a DVMRP router in a DVMRP domain to perform a reverse path forwarding check for an external source. Multicast traffic is received from an external source at a DVMRP multicast border router. When a determination is made that the external source is not listed in a DVMRP table maintained on the DVMRP multicast border router, a route report is generated for the external source and injected into the DVMRP domain. The route report includes routing information for the external source and a predetermined metric value. The route report can be propagated in the DVMRP domain so that all DVMRP routers in the DVMRP domain receive the routing information for the network having the external source.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method for enabling a Distance Vector Multicast Routing Protocol (DVMRP) router in a DVMRP domain to perform reverse path forwarding (RPF) checks for sources outside the domain, i.e., external sources. Static or dynamic route reports are generated at a multicast border router (MBR) and injected into the DVMRP domain containing the DVMRP router. The route reports are propagated throughout the domain so that all DVMRP routers in the domain have routing information for the external sources and can perform RPF checks.

Figure 1:
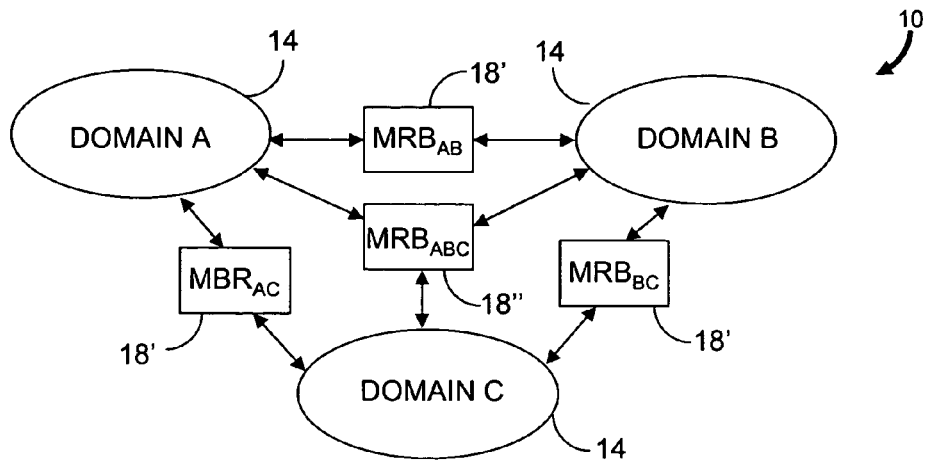
FIG. 1 is a block diagram of a networked environment including multiple multicast domains interfaced through multicast border routers.

FIG. 1 depicts a networked environment 10 for multicast routing that includes three autonomous multicast routing domains 14. MBRs 18' and 18" (generally 18) are used to enable communication between sources and receivers located in different multicast routing domains 14. As illustrated, three of the MBRs 18' enable communication between two associated multicast routing domains 14 and one MBR 18" enables communication between any two of the three multicast routing domains 14.

Each MBR 18 includes two or more multicast routing components (MRCs). Different MRCs collect and maintain different information and normally the information is not exchangeable across the MRCs in an MBR. To ensure all multicast traffic is delivered to the intended receivers regardless of their multicast routing domains, each MRC has to be a wild-card receiver for all multicast traffic generated by the other MRCs in an MBR. For example, in an MBR that connects a Protocol Independent Multicast-Sparse Mode (PIM-SM) domain and a DVMRP domain, the DVMRP MRC has to be a wild-card receiver for all multicast traffic generated in the PIM-SM domain interfaced through the PIM-SM MRC, and deliver the received traffic to the connected DVMRP domain. Similarly, the PIM-SM MRC has to be a wild-card receiver for all multicast traffic generated in the DVMRP domain interfaced through the DVMRP MRC, and deliver the received traffic to the connected PIM-SM domain.

After externally-generated multicast traffic from one multicast domain 18 is delivered to a receiving multicast domain 18, the internal routers (i.e., non-MBR routers) in the receiving domain perform validation checks, including RPF checking. RPF checking is used for multicast routers to detect and avoid routing loops in multicast traffic forwarding. For example, traffic may be generated in a DVMRP domain and delivered to a PIM-SM domain by a wild-card receiver PIM-SM MRC in an MBR having PIM-SM and DVMRP MRCs. The non-MBR routers in the PIM-SM domain use RPF checking to ensure the interface on which the traffic is received is the same interface that is used as the next hop when routing back towards the multicast source. PIM related protocols (PIM-SM, source-specific mode, and dense mode) use unicast routing tables for RPF checking. Routers in a DVMRP domain generate and maintain multicast routing information tables for RPF checking based on the route exchange mechanism built internally in the DVMRP protocol.

DVMRP is an important multicast routing protocol and is the protocol used in the multicast backbone (MBone), a virtual network on top of the Internet which supports the routing of IP multicast packets. The DVMRP protocol is a distance vector protocol, i.e., each router maintains a table (i.e., a vector) having the best known distance to each destination and which router interface to use to for the destination. These tables are updated by exchanging information with neighboring routers in the DVMRP domain.

The multicast routing information table maintained in DVMRP routers include DVMRP generated routing information but do not normally include multicast routing information related to sources located outside the DVMRP domain. For a MBR with a DVMRP MRC, multicast traffic from an external source intended for the DVMRP domain is accepted because the DVMRP MRC acts as a wild-card receiver. However, when the multicast traffic is then delivered to an internal (i.e., non-MBR) DVMRP router for processing, the internal DVMRP router does not have the RPF information for the external source and, as a result, the multicast traffic is dropped.

Figure 2:
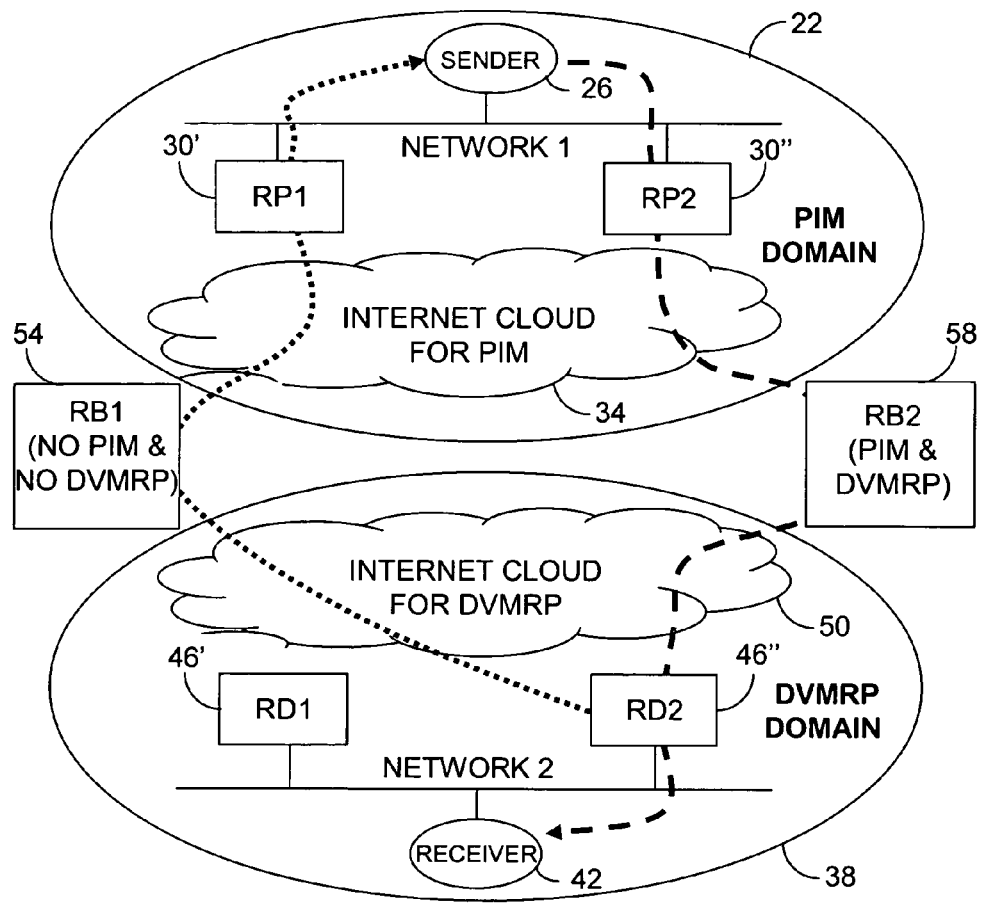
FIG. 2 is a block diagram of an example of a networked environment in which the method of the invention can be practiced.

FIG. 2 illustrates one example of how multicast traffic from an external source is handled in a DVMRP domain. A PIM domain 22 includes an external source (i.e., sender) 26, PIM routers RP1 30' and RP2 30" (generally RP 30), and a PIM cloud 34. A DVMRP domain 38 includes a multicast receiver 42, DVMRP routers RD1 46' and RD2 46" (generally RD 46), and a DVMRP cloud 50. Two border routers RB1 54 and RB2 58 each interface with the PIM domain 22 and the DVMRP domain 38. One of the border routers RB1 54 is not configured to manage multicast traffic. The other border router RB2 58 is a MBR and includes a PIM MRC and a DVMRP MRC to enable multicast traffic to be exchanged between the two domains 22 and 38.

Multicast traffic from the sender 26 is received at the border router RB2 58 because it is the only available MBR. The DVMRP MRC in the border router RB2 58 is a wild-card receiver and therefore multicast traffic from the sender 26 is accepted and flooded into the DVMRP cloud 50.

Multicast traffic received by a multicast router generally results in a RPF check to ensure the traffic from the sender 26 is received at an interface that is used as the next hop interface towards the sender 26. Accordingly, the multicast traffic delivered to the DVMRP router RD2 46" causes an RPF check to be performed. The routing information maintained by the DVMRP router RD2 46" and used for the RPF check is limited to networks and hosts that are located in the DVMRP domain 38. The multicast routing information table for DVMRP router RD2 46" does not include routing information related to the network and hosts located in the PIM domain 22. Consequently, the RPF check for multicast traffic sent by the sender 26 fails and the multicast traffic is dropped instead of being delivered to the intended receiver 42.

A unicast routing information table cannot be used for an RPF check when the DVMRP router RD2 46" cannot find the multicast routing information for the sender 26 because the DVMRP protocol does not support this technique. In addition, if the DVMRP router RD2 46" uses unicast routing information for multicast routing purposes when the required information is absent, there is a chance that the path indicated by the unicast routing information is not multicast capable and does not match the correct multicast path. More specifically, the unicast path designated by the fine dashed line from the DVMRP router RD2 46" through the DVMRP cloud 50, to border router RB1 54, through the PIM cloud 34, to PIM router RP1 30' and finally to sender 26 is not multicast capable because the border router RB1 54 does not support multicast traffic. Moreover, this unicast path does not match the correct multicast path designated by the coarse dashed line from the DVMRP router RD2 46" through the DVMRP cloud 50, to border router RB2 58, through the PIM cloud 34, to PIM router RP2 30" and finally to sender 26.

The PIM routers 30 are protocol independent and do not maintain their own multicast routing information. Instead, each PIM router 30 uses unicast routing information to perform the RPF check. Consequently, any router in a PIM multicast implementation that is disposed in a potential shortest path from any multicast sender to a multicast receiver must be PIM enabled or the multicast traffic may be dropped. In contrast, DVMRP routers 46 maintain and use only DVMRP-generated multicast routing information. This provides a DVMRP domain the flexibility to determine which path or paths can be used for multicast traffic.

In accordance with the invention, a DVMRP MBR bringing multicast traffic from an external source into a DVMRP domain provides the DVMRP routers within the DVMRP domain with related routing information for the external source. The DVMRP routers do not have the capability to know such routing information unless it is made available by the DVMRP MBR. In one embodiment, the DVMRP MBR generates DVMRP routes for all possible external multicast sources and injects these routes into the DVMRP domain. Through propagation amongst the internal DVMRP routers all the DVMRP routers in the same DVMRP domain receive the multicast routing information of the external sources, thus enabling RPF checking.

Route generation and injection at a DVMRP MBR can be performed statically. After the DVMRP MBR becomes active, it generates a static route report for each external source identified in a list of known external sources. The static route reports are then sent to the neighboring DVMRP routers and propagation of the static route reports continues until all the DVMRP routers in the DVMRP domain have the route information for the external sources known to the DVMRP MBR. The external source list is compiled so that none of the static route reports are for sources already existing in the DVMRP routers. In addition, because there is no preexisting routing information in the DVMRP routing table for the external source, there is no possible comparison to other routing information, therefore the metric field in each static route report is set to the smallest possible value (e.g., "1"). The smallest value ensures that the scope of the metric within the DVMRP domain is not unnecessarily diminished.

Figure 3:
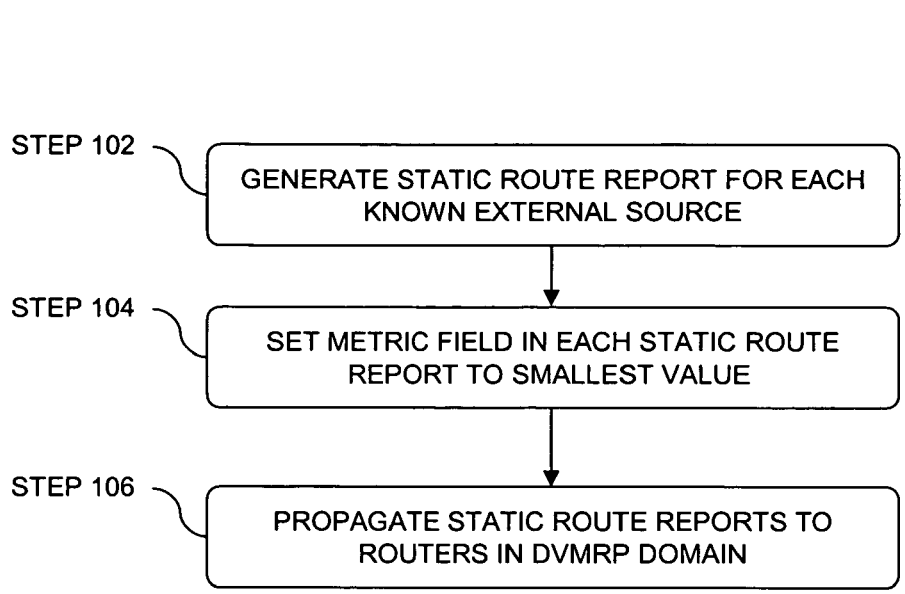
FIG. 3 is a flowchart representation of an embodiment of a method for enabling a DVMRP router in a DVMRP domain to perform reverse path forwarding for external sources in accordance with the invention.

FIG. 3 is a flowchart representation of an embodiment of a method 100 for enabling a DVMRP router in a DVMRP domain to perform reverse path forwarding for external sources according to the invention. Referring to FIG. 2 and FIG. 3, the MBR RB2 58 is configured to maintain a list of source network addresses for all known sources, including NETWORK 1. When the MBR RB2 52 is initialized, route reports are generated (step 102) for each known external source, including NETWORK 1, and the metric value for each such route is set (step 104) to a smallest value (e.g., "1"). The route report propagates (step 106) through the DVMRP cloud 50 to all the DVMRP routers in the domain 38, including routers RD1 46' and RD2 46".

Figure 4:
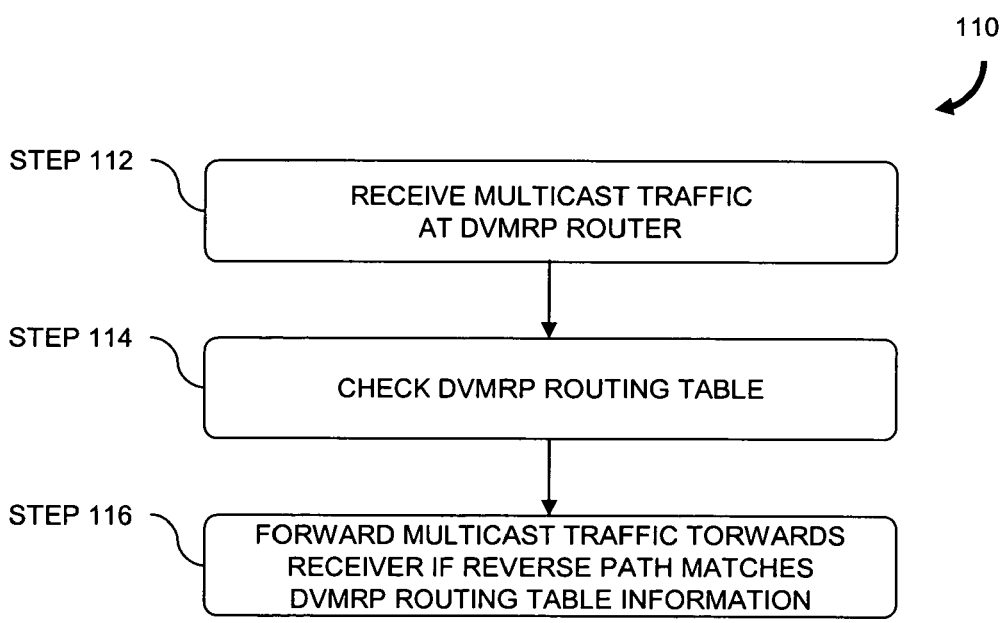
FIG. 4 is a flowchart representation of processing of multicast traffic by a DVMRP router in a DVMRP domain.

The processing 110 of multicast traffic is shown by flowchart in FIG. 4. When multicast traffic from the sender 26 crosses between domains 22, 38 at MBR RB2 58 and is received (step 112) at a DVMRP router, the router responds by checking (step 114) its DVMRP routing table. The DVMRP router determines that the reverse path matches the information in the DVMRP routing table and, therefore, forwards (step 116) the multicast traffic towards the receiver. The router can be DVMRP router RD2 46" which forwards the multicast traffic directly to the receiver 42. Alternatively, the router can be an intervening DVMRP router disposed in the path between the DVMRP router RD2 46" and the MBR RB2 52. If the router is an intervening router, one or more additional routers (including the router RD2 46" interface to the receiver's network (NETWORK 2) will receive the multicast traffic and perform their own RPF checks in a similar manner.

In alternative embodiments of the method for enabling a DVMRP router in a DVMRP domain to perform reverse path forwarding for external sources in accordance with the invention, route generation and injection at a DVMRP MBR is performed dynamically. The dynamic information includes the unicast route to the external source or the arrival of the multicast traffic from the external source.

Figure 5:
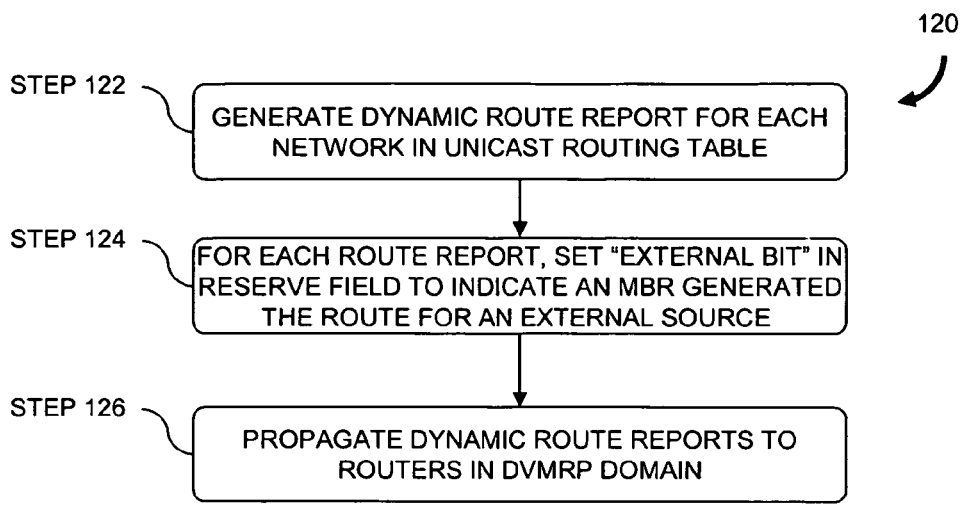
FIG. 5 is a flowchart representation of an embodiment of a method for dynamically enabling a DVMRP router in a DVMRP domain to perform reverse path forwarding for an external source in accordance with the invention.

FIG. 5 is a flowchart representation of an embodiment of a method 120 for enabling a DVMRP router in a DVMRP domain to perform reverse path forwarding for external sources using unicast routing information. Referring also to FIG. 2, the MBR RB2 58 generates (step 122) DVMRP route reports for networks in its unicast routing table, including the default unicast route. A source can correspond to a route range in the original DVMRP routing table and a different route range in the injected DVMRP route reports. The original DVMRP route has priority over the injected route and can have any valid metric value therefore the metric value included with the injected route does not ensure that the original DVMRP route will be chosen instead of the injected route. To avoid an improper route selection, every route report packet generated from the unicast routing table for an external source includes an indicator that is set (step 124) to indicate that the associated route was generated by an MBR for an external source. The indicator can be, for example, a bit in a reserved field (i.e., unused field) of the DVMRP route report. The DVMRP route reports are injected into the DVMRP domain 38 and propagated (step 126) to the DVMRP routers. As a result, all the DVMRP routers in the DVMRP domain 38 are updated to include all unicast networks.

Figure 6:
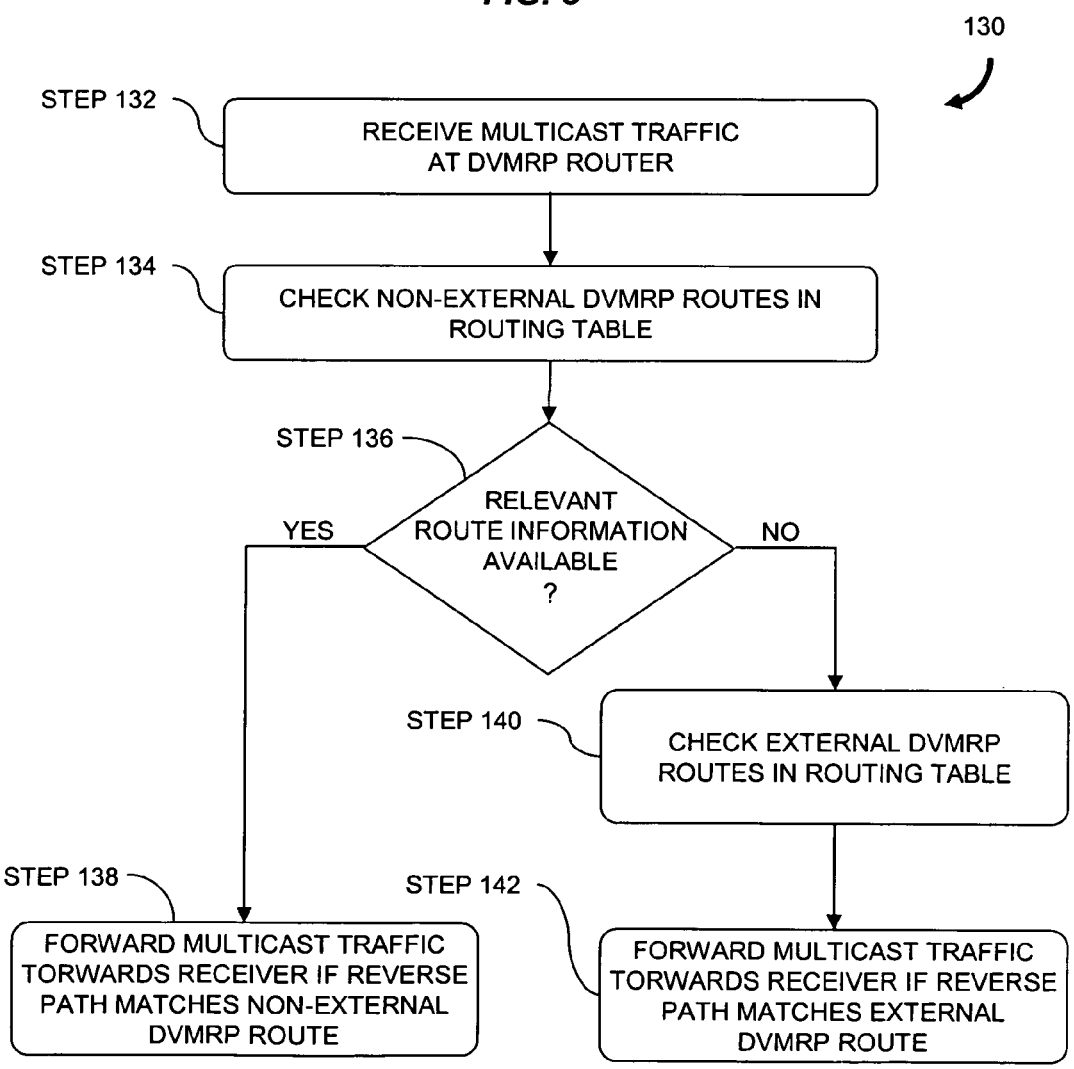
FIG. 6 is a flowchart representation of processing of multicast traffic generated by the method depicted in FIG. 5.

FIG. 6 depicts by flowchart representation an embodiment of a method 130 for processing multicast traffic with a DVMRP router enabled according to the method 120 of FIG. 5. Multicast traffic is received (step 132) at a DVMRP router in the DVMRP domain 38. To determine a route to use for RPF checking, the DVMRP router searches (step 134) routes in its routing table that do not include an indicator of an external source (i.e., non-external routes). If a route is found (step 136), the multicast traffic is forwarded (step 138) towards the receiver 42 if the reverse path matches the route. If no route is found (step 136), the DVMRP router searches (step 140) the routes generated by the MBR RB2 58 for external sources. If such a route is found, the multicast traffic is forwarded (step 142) towards the receiver 42 if the reverse path matches the route.

One advantage of the method 130 is that the routes for all of the known external sources are always available. As a result, when external multicast traffic arrives, there is no delay and the traffic is not lost. The size of the DVMRP routing tables, however, is large as it linked to the size of the unicast routing table even though many of the unicast networks may not have any multicast senders.

Figure 7:
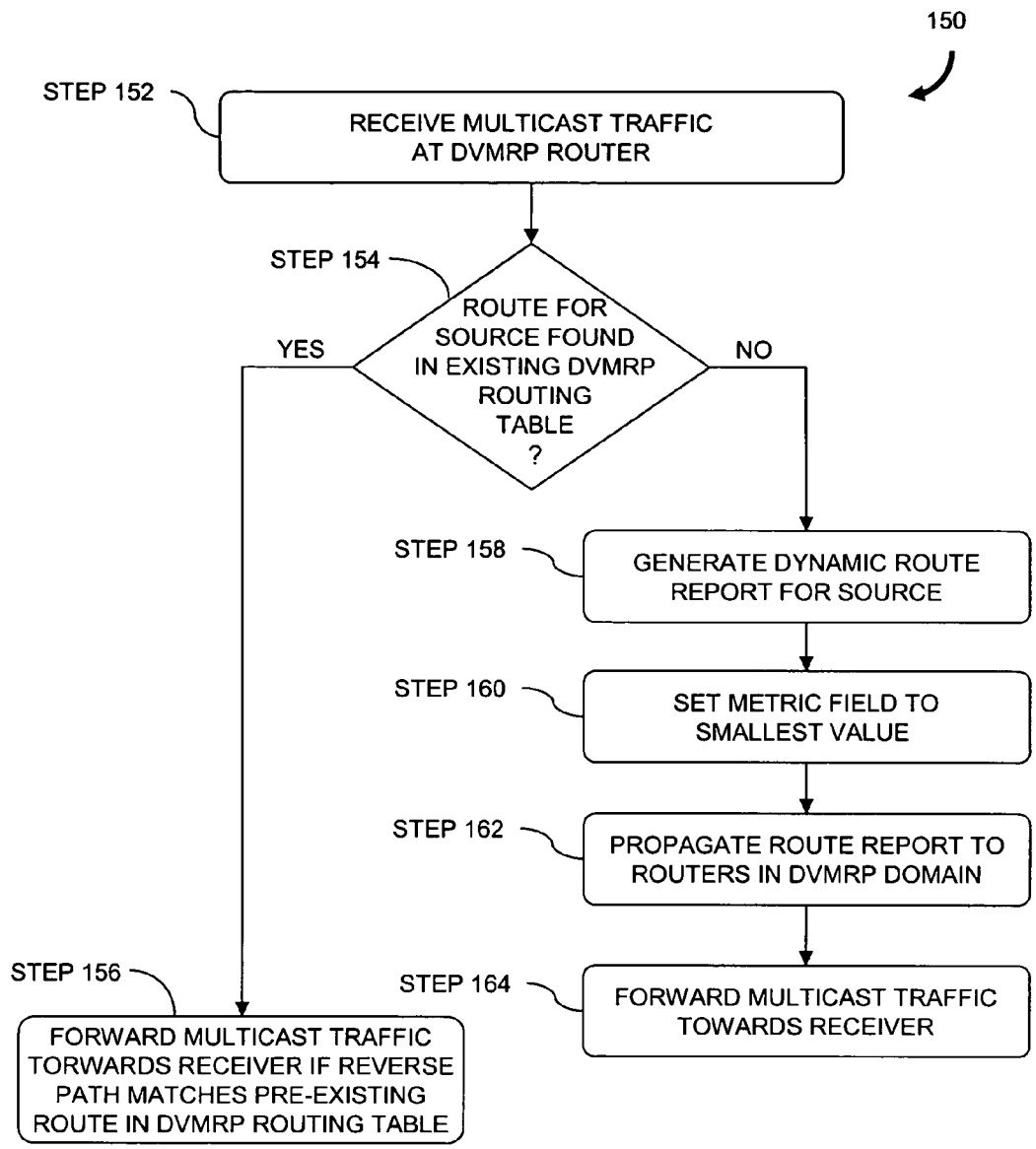
FIG. 7 is a flowchart representation of another embodiment of a method for dynamically enabling a DVMRP router in a DVMRP domain to perform reverse path forwarding for an external source in accordance with the invention.

FIG. 7 is a flowchart representation of another embodiment of a method 150 for enabling a DVMRP router in a DVMRP domain to perform reverse path forwarding for external sources. The method 150 is initiated when multicast traffic is received (step 152) at the MBR RB2 58. If a pre-existing route is found (step 154) for the external source in the DVMRP routing table of the MBR RB2 58, the multicast traffic is forwarded (step 156) to the receiver 42 if the reverse path matches the route. However, if it is determined (step 154) that no route exists for the external source in the DVMRP routing table, the MBR RB2 58 generates (step 158) a route for the source, including a 32 bit IP network mask and the metric field for the route is set (step 160) to a minimum value (e.g., "1"). The route report is injected into the DVMRP domain 38 for propagation (step 162) to all the routers in the DVMRP domain 38 and the multicast traffic is forwarded (step 164) towards the receiver 42. Subsequently, all routers in the DVMRP domain 38 can use the generated route for RPF checking.

When multicast traffic is received at the MBR RB2 58 from a previously unknown external source, there is a finite time during which the route is generated and additional time required for propagation of the route report to all routers in the DVMRP domain 38. Consequently, one or more of the earliest sent packets can be discarded by routers in the domain 38 that do not yet have the routing information in their DVMRP routing tables.

Advantageously, the generated route is never included in any pre-existing DVMRP route range because the route is created only for previously unknown external sources. In addition, because the added routes are only for existing senders, the size of the DVMRP routing table is more efficiently managed than for the other methods described above. In a further embodiment, a generated route is removed from the DVMRP routing tables of all routers in the DVMRP domain 38 if no multicast traffic is received from the associated external source after a predetermined interval. Thus the size of the DVMRP routing table is efficiently controlled.

While the invention has been shown and described with reference to specific embodiments, it should be understood by those skilled in the art that various changes in form and detail may be made therein without departing from the spirit and scope of the invention.

What is claimed is:

1. A method for dynamically enabling a Distance Vector Multicast Routing Protocol (DVMRP) router in a DVMRP domain to perform a reverse path forwarding check for an external source, the method comprising:
  generating a route report for each network listed in a unicast routing table maintained on a DVMRP multicast border router, each route report comprising unicast routing information for each of the networks and an indicator designating the unicast routing information is set to indicate that the associated route was generated by a multicast border router (MBR) for an external source; and
  injecting the route reports into the DVMRP domain.

2. The method of claim 1 wherein the indicator comprises at least one bit in a reserved field in the routing information.

3. The method of claim 1 further comprising propagating the route reports in the DVMRP domain so that all DVMRP routers in the DVMRP domain receive the routing information for each of the networks listed in the unicast routing table.

4. The method of claim 3 further comprising, for each of the DVMRP routers in the DVMRP domain, storing the route reports in a DVMRP routing table.

5. The method of claim 4 further comprising: receiving a packet comprising multicast data at one of the DVMRP routers; and
  forwarding the packet towards a receiver if a reverse path for the packet matches routing information in the DVMRP routing table of the DVMRP router associated with one of the networks listed in the unicast routing table.

6. The method of claim 1 wherein the generation of the route reports is performed at a multicast border router for the DVMRP domain.

* * * * *